(12) United States Patent
Jiang et al.

(10) Patent No.: US 12,245,058 B2
(45) Date of Patent: Mar. 4, 2025

(54) METHOD AND DEVICE IN FIRST NODE FOR WIRELESS COMMUNICATION

(71) Applicants: Qi Jiang, Shanghai (CN); Xiaobo Zhang, Shanghai (CN); Lin Yang, Shanghai (CN)

(72) Inventors: Qi Jiang, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 580 days.

(21) Appl. No.: 17/220,938

(22) Filed: Apr. 2, 2021

(65) Prior Publication Data

US 2021/0227412 A1 Jul. 22, 2021

Related U.S. Application Data

(63) Continuation of application No. PCT/CN2019/122661, filed on Dec. 3, 2019.

(30) Foreign Application Priority Data

Dec. 12, 2018 (CN) .......................... 201811517622.6

(51) Int. Cl.
*H04W 24/08* (2009.01)
*H04L 1/00* (2006.01)
(Continued)

(52) U.S. Cl.
CPC ........... *H04W 24/08* (2013.01); *H04L 1/0038* (2013.01); *H04L 1/0061* (2013.01);
(Continued)

(58) Field of Classification Search
CPC ... H04L 1/0038; H04L 1/1887; H04L 5/0055; H04W 24/08; H04W 72/0446;
(Continued)

(56) References Cited

U.S. PATENT DOCUMENTS

2010/0329194 A1 12/2010 Shen et al.
2020/0029318 A1* 1/2020 Guo ...................... H04L 1/1822
(Continued)

FOREIGN PATENT DOCUMENTS

CN 106550317 A 3/2017
CN 106559187 A 4/2017
(Continued)

OTHER PUBLICATIONS

CN201811517622.6 1st Office Action dated Mar. 26,2021.
(Continued)

*Primary Examiner* — Pao Sinkantarakorn

(57) ABSTRACT

The disclosure provides a method and a device in a first node for wireless communication. The first node first monitors a first signaling and a second signaling in a first time-frequency resource set, then judges whether to transmit a first radio signal according to a monitoring result of the first signaling, and finally transmits the first radio signal in a second time-frequency resource set, when judging to transmit the first radio signal; wherein the second signaling is not detected in the first time-frequency resource set, a signaling format corresponding to the second signaling is used for scheduling of a data signal. Through designing the first signaling and the second signaling, the disclosure solves the problem of missing detection of a sidelink scheduling signaling in Vehicle-to-Everything (V2X) caused when a data receiver only feeds back incorrect reception, thereby improving the overall performance of the system.

16 Claims, 7 Drawing Sheets

(51) Int. Cl.
*H04W 72/0446* (2023.01)
*H04W 72/0453* (2023.01)
*H04W 72/1263* (2023.01)
*H04W 72/50* (2023.01)

(52) U.S. Cl.
CPC ... *H04W 72/0446* (2013.01); *H04W 72/0453* (2013.01); *H04W 72/1263* (2013.01); *H04W 72/535* (2023.01)

(58) Field of Classification Search
CPC ............ H04W 72/0453; H04W 72/12; H04W 72/121; H04W 72/1263; H04W 72/25
See application file for complete search history.

(56) References Cited

U.S. PATENT DOCUMENTS

| | | | |
|---|---|---|---|
| 2020/0100215 A1* | 3/2020 | Li | H04W 74/002 |
| 2021/0297199 A1* | 9/2021 | Miao | H04L 5/0055 |
| 2021/0344454 A1* | 11/2021 | Lee | H04L 1/1692 |
| 2022/0007403 A1* | 1/2022 | Li | H04W 72/20 |
| 2022/0353846 A1* | 11/2022 | Wang | H04W 72/0446 |

FOREIGN PATENT DOCUMENTS

| | | |
|---|---|---|
| CN | 107343297 A | 11/2017 |
| CN | 107846731 A | 3/2018 |
| CN | 107889268 A | 4/2018 |
| CN | 108476089 A | 8/2018 |
| CN | 108809527 A | 11/2018 |
| CN | 108988983 A | 12/2018 |
| WO | 2018121332 A1 | 7/2018 |

OTHER PUBLICATIONS

CN201811517622.6 First Search Report dated Mar. 16, 2021.
ISR received in application No. PCT/CN2019/122661 dated Mar. 12, 2020.
INTERDIGITAL INC"Support of NR Sidelink Unicast and Groupcast"3GPP TSG RAN WG1 Meeting #94bis, R1-1811209,Oct. 12, 2018.
ASUSTek R2-145065, Uuinterface-ProSe Communication 3GPP TSG-RAN2 Meeting #88 Nov. 8, 2014.

* cited by examiner

METHOD AND DEVICE IN FIRST NODE FOR WIRELESS COMMUNICATION

CROSS REFERENCE TO RELATED APPLICATIONS

This application is a continuation of International Application No. PCT/CN2019/122661, filed Dec. 3, 2019, claims the priority benefit of Chinese Patent Application No. 201811517622.6, filed on Dec. 12, 2018, the full disclosure of which is incorporated herein by reference.

BACKGROUND

Technical Field

The disclosure relates to transmission methods and devices in wireless communication systems, and in particular to a communication method and device on a sidelink in wireless communication.

Related Art

Application scenarios of future wireless communication systems are becoming increasingly diversified, and different application scenarios have different performance requirements on systems. In order to meet different performance requirements of various application scenarios, the $3^{rd}$ Generation Partner Project (3GPP) Radio Access Network (RAN) #72 plenary session decided to conduct the study of New Radio (NR) (or 5G). The work item of NR was approved at the 3GPP RAN #75 session to standardize the NR.

In view of Vehicle-to-Everything (V2X) services developing rapidly, 3GPP has also started the initiation of standards formulation and researches under NR framework. At present, 3GPP has accomplished the work of formulation of requirements orienting 5G V2X services and has written it into standards TS22.886. 3GPP defines four use case groups for 5G V2X services, including Vehicles Platooning, Extended Sensors, Advanced Driving and Remote Driving. The technical research of NR V2X was started at the 3GPP RAN #80 session.

SUMMARY

In order to meet requirements of new services, compared with LTE V2X systems, NR V2X systems have higher throughput, higher reliability, lower latency, further transmission distance, more accurate positioning, higher variability in packet size and transmission periodicity, and more efficient key technical features coexisting with current 3GPP technologies and non-3GPP technologies. The work mode of the present LTE V2X systems is limited to broadcast transmission only. According to common knowledges reached at the 3GPP RAN #80 plenary session, NR V2X will study a technical scheme supporting multiple work modes of unicast, groupcast and broadcast.

In the work mode of the present LTE Device to Device (D2D)/V2X, a Physical Sidelink Feedback Channel (PSFCH) is introduced to V2X R16, and the PSFCH is at least used for a Hybrid Automatic Repeat request (HARQ) feedback on a sidelink. For the transmission mode of groupcast, one common view is that transmitting a Non-Acknowledgement (NACK) only when a Physical Sidelink Shared Channel (PSSCH) is not correctly received will help reduce the overhead of a feedback signaling. However, the transmission of NACK only will cause the following problem: the transmitter of data, when not receiving a NACK, cannot determine whether the data receiver does not transmit the NACK because the data is correctly received or because the data receiver does not know the existence of the data as scheduling information is not received.

In view of the above problems, the disclosure provides a solution to support unicast and groupcast transmission. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred. Further, although the disclosure is initially designed for unicast based transmission mechanisms, the disclosure is also applicable to broadcast and groupcast transmissions. Furthermore, although the disclosure is initially designed for single-carrier communications, the disclosure is also applicable to multi-carrier communications.

The disclosure provides a method in a first node for wireless communication, wherein the method includes:
  monitoring a first signaling and a second signaling in a first time-frequency resource set; and
  judging whether to transmit a first radio signal according to a monitoring result of the first signaling; and transmitting the first radio signal in a second time-frequency resource set, when judging to transmit the first radio signal.

Herein, the second signaling is not detected in the first time-frequency resource set, a signaling format corresponding to the second signaling is used for scheduling of a data signal; and the first radio signal is used for indicating that a data signal scheduled by the second signaling is not correctly decoded.

In one embodiment, the above method has the following benefits: the first signaling and the second signaling together act as one reference signaling for feeding back a NACK, moreover, a relationship is established between the first signaling and the second signaling, that is, when the first node does not correctly decode either of the first signaling and the second signaling, a NACK is fed back through the first radio signal; the above method makes the first radio signal act as a common feedback for the first signaling and the second signaling, thereby informing a transmitting end of the first signaling of the receiving situations of the first signaling and the second signaling, and avoiding the problem that the transmitting end of the first signaling cannot know the loss of a control signaling.

In one embodiment, the above method has another following benefit: in the first time-frequency resource set, there must exist at least one of the first signaling and the second signaling, thus, the first node knows that, if no physical layer control signaling is decoded in the first time-frequency resource set, the first node must have a detection error and cannot correctly receive a data signal scheduled by the physical layer control signaling. In this condition, the transmission of the first radio signal guarantees that the transmitter of the first signaling will explicitly know that the scheduled data signal is not correctly received.

According to one aspect of the disclosure, the above method is characterized in that: if the first signaling is not correctly received, it is judged to transmit the first radio signal; otherwise, it is judged not to transmit the first radio signal.

In one embodiment, the above method has the following benefits: the first signaling and the second signaling must coexist, thus the decoding performance of the first signaling can determine the receiving performance of the data signal scheduled by the second signaling.

According to one aspect of the disclosure, the above method is characterized in that: the first signaling indicates Q1 node(s) from Q nodes, and the first node is one of the Q nodes; if the first node is one of the Q1 node(s), it is judged to transmit the first radio signal; otherwise, it is judged not to transmit the first radio signal; the Q is a positive integer greater than 1; and the Q1 is a positive integer not greater than the Q.

In one embodiment, the above method has the following benefits: the first signaling indicates whether there exists data the first node needs to decode in a given time window in which the first time-frequency resource set is located; if exists and the second signaling is not correctly received, the first node reports a NACK; if not exist, the first node does not report a NACK; the above method enables the design of the first signaling to be more flexible and saves overhead, without designing a dedicated first signaling for the first node.

According to one aspect of the disclosure, the above method is characterized in that: the first signaling is used for determining that the second signaling is transmitted by a transmitter of the first signaling in the first time-frequency resource set.

According to one aspect of the disclosure, the above method is characterized in that: a first time window includes M1 multicarrier symbols, and the first time window is located behind time domain resources occupied by the first time-frequency resource set; the first signaling is used for determining a type of any one multicarrier symbol among the M1 multicarrier symbols; and the M1 is a positive integer greater than 1.

In one embodiment, the above method has the following benefits: the first signaling is used for indicating a Slot Format Indicator (SFI); therefore, the first signaling is capable of indicating both an SFI and an existence of the second signaling.

According to one aspect of the disclosure, the above method is characterized in that: a second time window is located behind time domain resources occupied by the first time-frequency resource set; and the first signaling is used for determining whether the first node needs to perform a blind detection of a physical layer control signaling in the second time window.

In one embodiment, the above method has the following benefits: the first signaling is also used for a switch indication of a blind detection of the first node, for example, indicating the first node to enter Go-To-Sleep or Waking up the first node, further saving the power consumption of the first node and reducing the complexity of receiving of the first node.

According to one aspect of the disclosure, the above method includes:
  receiving first information.
  Herein, the first information is used for determining K1 first-type time-frequency resource sets, and the first time-frequency resource set is one of the K1 first-type time-frequency resource sets; and the K1 first-type time-frequency resource sets are reserved for transmission of a physical layer control signaling.

In one embodiment, the above method has the following benefits: the first information is used for determining positions of time-frequency resource sets where a blind detection of the first signaling is needed, thereby guaranteeing that the first node will absolutely perform a blind detection of the first signaling in some predefined time-frequency resource sets, and guaranteeing the reliability of the feedback through the first radio signal.

The disclosure provides a method in a second node for wireless communication, wherein the method includes:
  transmitting at least a first signaling of the first signaling and a second signaling in a first time-frequency resource set; and
  receiving a first radio signal in a second time-frequency resource set.
  Herein, the second signaling is not detected in the first time-frequency resource set, a signaling format corresponding to the second signaling is used for scheduling of a data signal; and the first radio signal is used for indicating that a data signal scheduled by the second signaling is not correctly decoded by a transmitter of the first radio signal.

According to one aspect of the disclosure, the above method is characterized in that: if the first signaling is not correctly received by the transmitter of the first radio signal, the transmitter of the first radio signal judges to transmit the first radio signal; otherwise, the transmitter of the first radio signal judges not to transmit the first radio signal.

According to one aspect of the disclosure, the above method is characterized in that: the first signaling indicates Q1 node(s) from Q nodes, and the transmitter of the first radio signal is one of the Q nodes; if the Q1 is not less than 1, the second node receives the first radio signal in the second time-frequency resource set; the Q is a positive integer greater than 1; and the Q1 is a positive integer not greater than the Q.

According to one aspect of the disclosure, the above method is characterized in that: the first signaling is used for determining that the second signaling is transmitted by the second node in the first time-frequency resource set.

According to one aspect of the disclosure, the above method is characterized in that: a first time window includes M1 multicarrier symbols, and the first time window is located behind time domain resources occupied by the first time-frequency resource set; the first signaling is used for determining a type of any one multicarrier symbol among the M1 multicarrier symbols; and the M1 is a positive integer greater than 1.

According to one aspect of the disclosure, the above method is characterized in that: a second time window is located behind time domain resources occupied by the first time-frequency resource set; and the first signaling is used for determining whether the transmitter of the first radio signal needs to perform a blind detection of a physical layer control signaling in the second time window.

According to one aspect of the disclosure, the above method includes:
  transmitting first information.
  Herein, the first information is used for determining K1 first-type time-frequency resource sets, and the first time-frequency resource set is one of the K1 first-type time-frequency resource sets; and the K1 first-type time-frequency resource sets are reserved for transmission of a physical layer control signaling.

The disclosure provides a first node for wireless communication, wherein the first node includes:
  a first receiver, to monitor a first signaling and a second signaling in a first time-frequency resource set; and
  a first transmitter, to judge whether to transmit a first radio signal according to a monitoring result of the first signaling; and to transmit the first radio signal in a second time-frequency resource set, when judging to transmit the first radio signal.

Herein, the second signaling is not detected in the first time-frequency resource set, a signaling format corresponding to the second signaling is used for scheduling of a data signal; and the first radio signal is used for indicating that a data signal scheduled by the second signaling is not correctly decoded.

The disclosure provides a second node for wireless communication, wherein the second node includes:

a second transmitter, to transmit at least a first signaling of the first signaling and a second signaling in a first time-frequency resource set; and a second receiver, to receive a first radio signal in a second time-frequency resource set.

Herein, the second signaling is not detected in the first time-frequency resource set, a signaling format corresponding to the second signaling is used for scheduling of a data signal; and the first radio signal is used for indicating that a data signal scheduled by the second signaling is not correctly decoded by a transmitter of the first radio signal.

In one embodiment, compared with conventional schemes, the disclosure has the following advantages.

The first signaling and the second signaling together act as one reference signaling for feeding back a NACK, moreover, a relationship is established between the first signaling and the second signaling, that is, when the first node does not correctly decode either of the first signaling and the second signaling, a NACK is fed back through the first radio signal; the above method makes the first radio signal act as a common feedback for the first signaling and the second signaling, thereby informing a transmitting end of the first signaling of the receiving situations of the first signaling and the second signaling, and avoiding the problem that the transmitting end of the first signaling cannot know the loss of a control signaling.

The first signaling indicates whether there exists data the first node needs to decode in a given time window in which the first time-frequency resource set is located; if exists and the second signaling is not correctly received, the first node reports a NACK; if not exist, the first node does not report a NACK; the above method enables the design of the first signaling to be more flexible and saves overhead, without designing a dedicated first signaling for the first node.

The first signaling is used for indicating an SFI; or the first signaling is also used for a switch indication of a blind detection of the first node, for example, indicating the first node to enter Go-To-Sleep or Waking up the first node; the function of the first signaling is increased, further saving the power consumption of the first node and reducing the complexity of receiving of the first node.

The first information is used for determining positions of time-frequency resource sets where a blind detection of the first signaling is needed, thereby guaranteeing that the first node will absolutely perform a blind detection of the first signaling in some predefined time-frequency resource sets, and guaranteeing the reliability of the feedback through the first radio signal.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
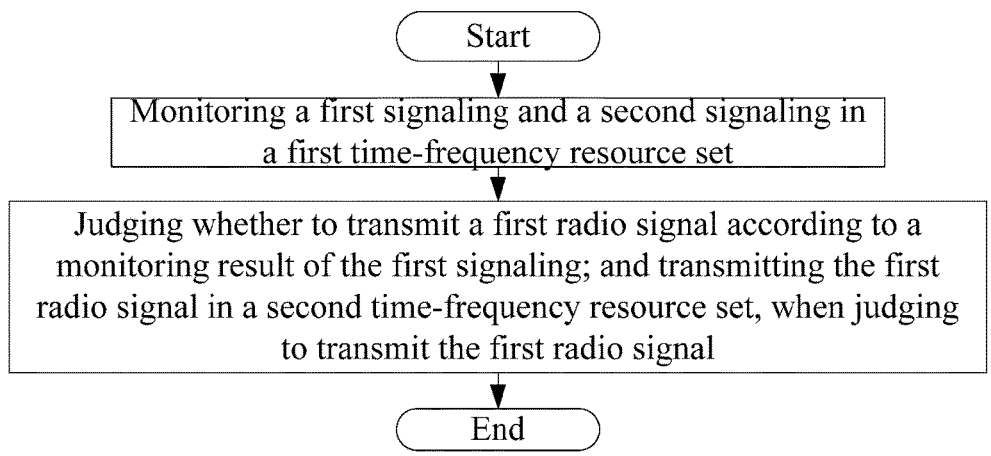
FIG. 1 is a flowchart of a first signaling according to one embodiment of the disclosure.

Embodiment 1 illustrates a flowchart of a first signaling, as shown in FIG. 1.

In Embodiment 1, the first node in the disclosure first monitors a first signaling and a second signaling in a first time-frequency resource set; then judges whether to transmit a first radio signal according to a monitoring result of the first signaling; and finally transmits the first radio signal in a second time-frequency resource set, when judging to transmit the first radio signal; wherein the second signaling is not detected in the first time-frequency resource set, a signaling format corresponding to the second signaling is used for scheduling of a data signal; and the first radio signal is used for indicating that a data signal scheduled by the second signaling is not correctly decoded.

In one embodiment, the above phrase that judges whether to transmit a first radio signal according to a monitoring result of the first signaling implies: the monitoring result of the first signaling is that the first signaling is not correctly decoded, and the first node transmits the first radio signal.

In one embodiment, the above phrase that judges whether to transmit a first radio signal according to a monitoring result of the first signaling implies: the monitoring result of the first signaling is that the first signaling is correctly decoded, but the second signaling is not detected in the first time-frequency resource set, then the first node transmits the first radio signal.

In one embodiment, if it is judged not to transmit the first radio signal, a zero transmit power is kept in the second time-frequency resource set.

In one embodiment, if it is judged not to transmit the first radio signal, a wireless listening is performed in the second time-frequency resource set.

In one embodiment, the monitoring result of the first signaling includes whether the first signaling is correctly decoded.

In one embodiment, the monitoring result of the first signaling includes an indication content in the first signaling.

In one subembodiment, the indication content in the first signaling includes: indicating that the second signaling is transmitted by a transmitter of the first signaling in the first time-frequency resource set.

In one subembodiment, the indication content in the first signaling includes: indicating Q1 node(s) from Q nodes, and indicating whether the first node is one of the Q1 node(s).

In one subembodiment, the indication content in the first signaling includes: indicating whether the first node needs to perform a blind detection of the second signaling after decoding the first signaling.

In one embodiment, the first node determines whether the first signaling is correctly decoded based on a Cyclic Redundancy Check (CRC) detection.

In one embodiment, the first signaling includes a CRC sequence scrambled with a given Radio Network Temporary Identifier (RNTI), and the first node performs a CRC sequence check through the given RNTI; the CRC sequence check is successful, and the first node considers that the first signaling is correctly decoded; or the CRC sequence check is not successful, and the first node considers that the first signaling is not correctly decoded.

In one embodiment, the first signaling includes a CRC sequence, and the first node, after receiving the first signaling, performs a modulo 2 division on a cyclic generator polynomial of the CRC sequence using the CRC sequence part in the received first signaling; if the obtained remainder is 0, the first node considers that the first signaling is correctly decoded; if the obtained remainder is not 0, the first node considers that the first signaling is not correctly decoded.

In one embodiment, the first node determines whether the first signaling is correctly decoded based on a sequence detection.

In one embodiment, the first signaling is generated through a first target sequence, the first target sequence is one of L1 first-type candidate sequences, and the L1 is a positive integer greater than 1.

In one subembodiment, the first node can determine the first target sequence from the L1 first-type candidate sequences according to the monitored first signaling through a coherent detection, and the first node considers that the first signaling is correctly received; or the first node cannot determine the first target sequence from the L1 first-type candidate sequences according to the monitored first signaling through a coherent detection, and the first node considers that the first signaling is not correctly received.

In one subembodiment, the first node can determine one first-type candidate sequence from the L1 first-type candidate sequences according to the monitored first signaling through a coherent detection, and the first node considers that the first signaling is correctly received; or the first node cannot determine one first-type candidate sequence from the L1 first-type candidate sequences according to the monitored first signaling through a coherent detection, and the first node considers that the first signaling is not correctly received.

In one embodiment, the first node determines whether the first signaling is correctly decoded through an anergy detection.

In one embodiment, a power of the first signaling monitored by the first node is not less than a given threshold, and the first node considers that the first signaling is correctly received; or a power of the first signaling monitored by the first node is less than a given threshold, and the first node considers that the first signaling is not correctly received.

In one embodiment, the first node determines that the second signaling is not correctly decoded through a CRC detection.

In one embodiment, the second signaling includes a CRC sequence, and the first node, after receiving the second signaling, performs a modulo 2 division on a cyclic generator polynomial of the CRC sequence using the CRC sequence part in the received second signaling; if the obtained remainder is 0, the first node considers that the second signaling is correctly decoded in the first time-frequency resource set; if the obtained remainder is not 0, the first node considers that the second signaling is not correctly decoded in the first time-frequency resource set.

In one embodiment, the first node determines that the second signaling is not correctly decoded through a sequence detection.

In one embodiment, the second signaling is generated through a second target sequence, the second target sequence is one of L2 second-type candidate sequences, and the L2 is a positive integer greater than 1.

In one subembodiment, the first node can determine the second target sequence from the L2 second-type candidate sequences according to the monitored second signaling through a coherent detection, and the first node considers that the second signaling is correctly received; or the first node cannot determine the second target sequence from the L2 second-type candidate sequences according to the monitored second signaling through a coherent detection, and the first node considers that the second signaling is not correctly received.

In one subembodiment, the first node can determine one second-type candidate sequence from the L2 second-type candidate sequences according to the monitored second signaling through a coherent detection, and the first node considers that the second signaling is correctly received; or the first node cannot determine one second-type candidate sequence from the L2 second-type candidate sequences according to the monitored second signaling through a coherent detection, and the first node considers that the second signaling is not correctly received.

In one embodiment, the first node determines whether the second signaling is correctly decoded through an anergy detection.

In one embodiment, a power of the second signaling monitored by the first node is not less than a given threshold, and the first node considers that the second signaling is correctly received; or a power of the first signaling monitored by the first node is less than a given threshold, and the first node considers that the second signaling is not correctly received.

In one embodiment, a physical layer channel occupied by the first signaling includes a Physical Sidelink Control Channel (PSCCH).

In one embodiment, a physical layer channel occupied by the second signaling includes a PSCCH.

In one embodiment, a physical layer channel occupied by the data signal includes a Physical Sidelink Shared Channel (PSSCH).

In one embodiment, a transport channel occupied by the data signal includes a Sidelink Shared Channel (SL-SCH).

In one embodiment, the data signal includes a Demodulation Reference Signal (DMRS).

In one embodiment, the signaling format corresponding to the first signaling is a Sidelink Control Information (SCI) format 0.

In one embodiment, the signaling format corresponding to the first signaling is an SCI format 1.

In one embodiment, the signaling format corresponding to the second signaling is an SCI format 0.

In one embodiment, the signaling format corresponding to the second signaling is an SCI format 1.

In one embodiment, the first signaling includes all fields of an SCI format 0, or the first signaling includes partial fields of an SCI format 0.

In one embodiment, the first signaling includes all fields of an SCI format 1, or the first signaling includes partial fields of an SCI format 0.

In one embodiment, the second signaling includes all fields of an SCI format 0, or the second signaling includes partial fields of an SCI format 0.

In one embodiment, the second signaling includes all fields of an SCI format 1, or the second signaling includes partial fields of an SCI format 0.

In one embodiment, the first signaling includes a CRC sequence, the CRC sequence is scrambled with a given RNTI, the given RNTI is specific to a terminal group, the terminal group includes a positive integer number of terminals, and the first node is one of the positive integer number of terminals.

In one embodiment, the second signaling includes a CRC sequence, the CRC sequence is scrambled with a given RNTI, the given RNTI is specific to a terminal group, the terminal group includes a positive integer number of terminals, and the first node is one of the positive integer number of terminals.

In one embodiment, the above phrase that a signaling format corresponding to the second signaling is used for scheduling of a data signal means: the signaling format corresponding to the second signaling indicates at least one of the following of the scheduled data signal:
occupied time domain resources;
occupied frequency domain resources;
a Modulation and Coding Status (MCS);
a Redundancy Version (RV);
a Hybrid Automatic Repeat reQuest (HARQ) process number.

In one embodiment, the above phrase that a signaling format corresponding to the second signaling is used for scheduling of a data signal means: the second signaling is used for indicating a configuration information group of the scheduled data signal, and the configuration information group includes at least one of occupied time domain resources, occupied frequency domain resources, an MCS, an RV and a HARQ process number.

In one embodiment, the first signaling is associated to a target time window, and the first signaling is used by the first node to determine whether a feedback is required for the reception of a radio signal in the target time window.

In one subembodiment, the target time window is one slot.

In one subembodiment, the target time window is one subframe.

In one subembodiment, the target time window includes time domain resources occupied by the first time-frequency resource set.

In one subembodiment, the first signaling is used for determining that the second signaling exists in the target time window, but the second signaling is not detected in the first time-frequency resource set, then the first node transmits the first radio signal.

In one embodiment, a physical layer channel occupied by the first radio signal includes a Physical Sidelink Feedback Channel (PSFCH).

In one embodiment, the first radio signal is used for determining that the first signaling is not correctly decoded by the first node.

In one embodiment, the first radio signal is used for determining that the second signaling is not correctly decoded by the first node.

In one embodiment, the first time-frequency resource set includes a positive integer number of Resource Elements (REs).

In one embodiment, the first time-frequency resource set includes a search space for the first signaling.

In one embodiment, the first time-frequency resource set includes a search space for the second signaling.

In one embodiment, the first time-frequency resource set includes a Control Resource Set (CORESET) for the first signaling.

In one embodiment, the first time-frequency resource set includes a CORESET for the second signaling.

In one embodiment, the second time-frequency resource set is associated to the first signaling.

In one embodiment, the first signaling is used for determining the second time-frequency resource set.

In one embodiment, the second time-frequency resource set includes a positive integer number of REs.

Embodiment 2

Figure 2:
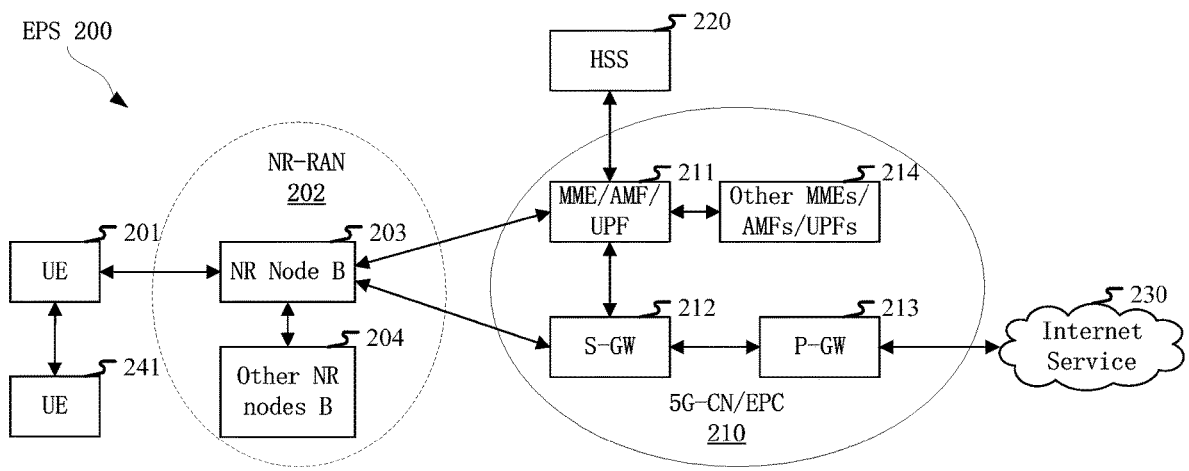
FIG. 2 is a diagram illustrating a network architecture according to one embodiment of the disclosure.

Embodiment 2 illustrates a diagram of a network architecture according to the disclosure, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other appropriate terms. The EPS 200 may include one or more UEs 201, one UE 241 in sidelink communication with the UE 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first node in the disclosure.

In one embodiment, the UE 241 corresponds to the second node in the disclosure.

In one embodiment, an air interface between the UE 201 and the gNB 203 is a Uu interface.

In one embodiment, an air interface between the UE 201 and the UE 241 is a PC-5 interface.

In one embodiment, a wireless link between the UE 201 and the gNB 203 is a cellular link.

In one embodiment, a wireless link between the UE 201 and the UE 241 is a sidelink.

In one embodiment, the first node in the disclosure is the UE 201, and the second node in the disclosure is one terminal in the coverage of the gNB 203.

In one embodiment, the first node in the disclosure is the UE 201, and the second node in the disclosure is one terminal outside the coverage of the gNB 203.

In one embodiment, the first node and the second node in the disclosure are both served by the gNB 203.

In one embodiment, unicast transmission is supported between the UE 201 and the UE 241.

In one embodiment, broadcast transmission is supported between the UE 201 and the UE 241.

In one embodiment, groupcast transmission is supported between the UE 201 and the UE 241.

In one embodiment, the UE 201 and the UE 241 belong to one terminal group, the UE 241 is a group manager of the terminal group, or the UE241 is a group head of the terminal group.

Embodiment 3

Figure 3:
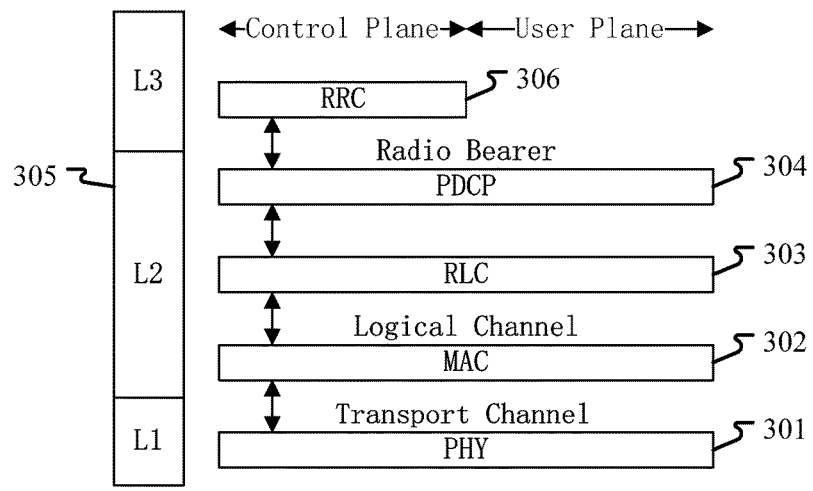
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a first node and a second node is illustrated by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the links between the first node and the second node over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the second node on the network side. Although not shown in FIG. 3, the first node may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between the second nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the first node and the second node is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the second node and the first node.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the first signaling in the disclosure is generated on the PHY 301.

In one embodiment, the second signaling in the disclosure is generated on the PHY 301.

In one embodiment, the first radio signal in the disclosure is generated on the PHY 301.

In one embodiment, the first radio signal in the disclosure is generated on the MAC sublayer 302.

In one embodiment, the first information in the disclosure is generated on the MAC sublayer 302.

In one embodiment, the first information in the disclosure is generated on the RRC sublayer 306.

Embodiment 4

Figure 4:
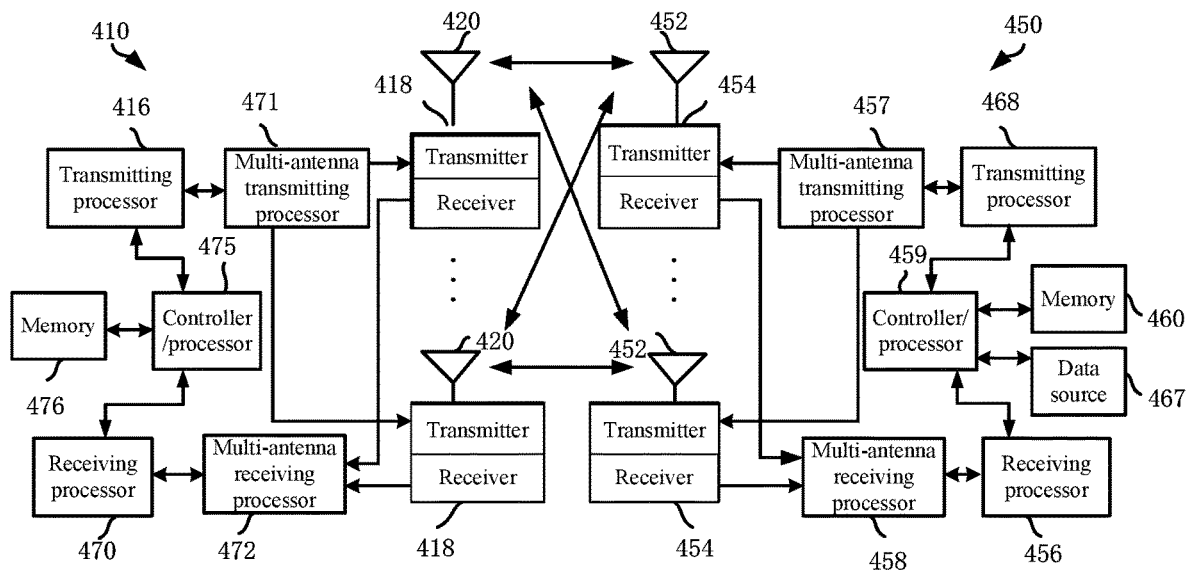
FIG. 4 is a diagram illustrating a first communication equipment and a second communication equipment according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the first communication equipment 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least monitors a first signaling and a second signaling in a first time-frequency resource set; judges whether to transmit a first radio signal according to a monitoring result of the first signaling; and transmits the first radio signal in a second time-frequency resource set, when judging to transmit the first radio signal; wherein the second signaling is not detected in the first time-frequency resource set, a signaling format corresponding to the second signaling is used for scheduling of a data signal; and the first radio signal is used for indicating that a data signal scheduled by the second signaling is not correctly decoded.

In one embodiment, the first communication equipment 450 includes a memory that stores a computer readable instruction program. The computer readable instruction program generates an action when executed by at least one processor. The action includes: monitoring a first signaling and a second signaling in a first time-frequency resource set; judging whether to transmit a first radio signal according to a monitoring result of the first signaling; and transmitting the first radio signal in a second time-frequency resource set, when judging to transmit the first radio signal; wherein the second signaling is not detected in the first time-frequency resource set, a signaling format corresponding to the second signaling is used for scheduling of a data signal; and the first radio signal is used for indicating that a data signal scheduled by the second signaling is not correctly decoded.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits at least a first signaling of the first signaling and a second signaling in a first time-frequency resource set, and receives a first radio signal in a second time-frequency resource set; wherein the second signaling is not detected in the first time-frequency resource set, a signaling format corresponding to the second signaling is used for scheduling of a data signal; and the first radio signal is used for indicating that a data signal scheduled by the second signaling is not correctly decoded by a transmitter of the first radio signal.

In one embodiment, the second communication equipment 410 includes a memory that stores a computer readable instruction program. The computer readable instruction program generates an action when executed by at least one processor. The action includes: transmitting at least a first signaling of the first signaling and a second signaling in a first time-frequency resource set, and receiving a first radio signal in a second time-frequency resource set; wherein the second signaling is not detected in the first time-frequency resource set, a signaling format corresponding to the second signaling is used for scheduling of a data signal; and the first radio signal is used for indicating that a data signal scheduled by the second signaling is not correctly decoded by a transmitter of the first radio signal.

In one embodiment, the first communication equipment 450 corresponds to the first node in the disclosure.

In one embodiment, the second communication equipment 410 corresponds to the second node in the disclosure.

In one embodiment, at least one of the antenna 452, the receiver 454, the multiantenna receiving processor 458 or the receiving processor 456 is used for monitoring a first signaling and a second signaling in a first time-frequency resource set.

In one embodiment, at least one of the antenna 420, the transmitter 418, the multiantenna transmitting processor 471 or the transmitting processor 416 is used for transmitting at least a first signaling of the first signaling and a second signaling in a first time-frequency resource set.

In one embodiment, at least one of the antenna 420, the transmitter 418, the multiantenna transmitting processor 471 or the transmitting processor 416 is used for transmitting a first signaling and a second signaling in a first time-frequency resource set.

In one embodiment, at least one of the antenna 420, the transmitter 418, the multiantenna transmitting processor 471 or the transmitting processor 416 is used for transmitting only a first signaling in a first time-frequency resource set.

In one embodiment, at least one of the antenna 452, the transmitter 454, the multiantenna transmitting processor 457, the transmitting processor 468 or the controller/processor 459 is used for judging whether to transmit a first radio signal according to a monitoring result of the first signaling.

In one embodiment, if the first communication equipment 450 judges to transmit the first radio signal, at least one of the antenna 452, the transmitter 454, the multiantenna transmitting processor 457, the transmitting processor 468 or the controller/processor 459 is used for transmitting the first radio signal in a second time-frequency resource set.

In one embodiment, at least one of the antenna 420, the receiver 418, the multiantenna receiving processor 472 or the receiving processor 470 is used for receiving the first radio signal in a second time-frequency resource set.

In one embodiment, at least one of the antenna 452, the receiver 454, the multiantenna receiving processor 458 or the receiving processor 456 is used for receiving first information; and at least one of the antenna 420, the transmitter 418, the multiantenna transmitting processor 471 or the transmitting processor 416 is used for transmitting first information.

Embodiment 5

Figure 5:
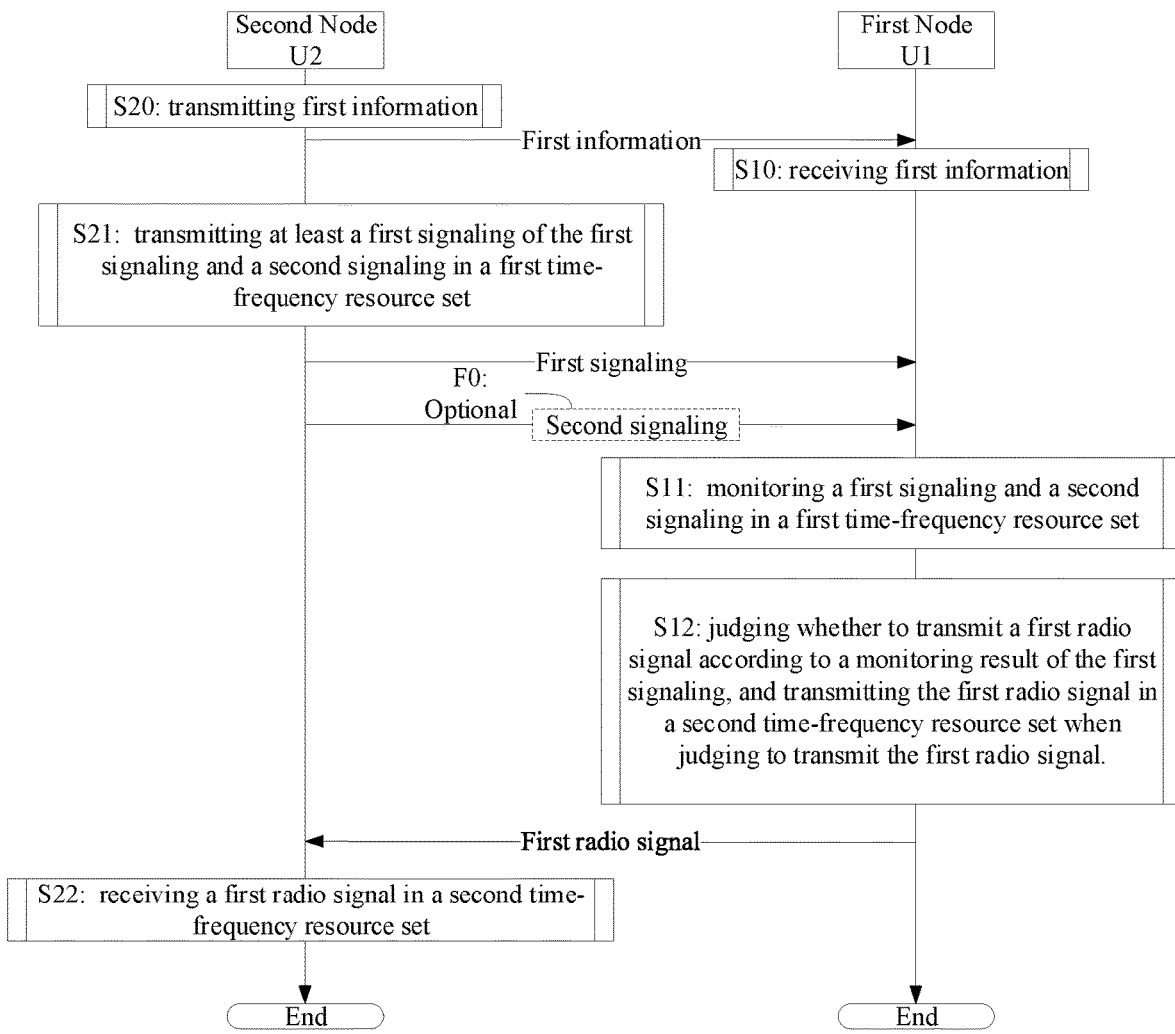
FIG. 5 is a flowchart of a first radio signal according to one embodiment of the disclosure.

Embodiment 5 illustrates a flowchart of a first radio signal, as shown in FIG. 5. In FIG. 5, a first node U1 and a second node U2 perform communication through a sidelink. F0 marked in FIG. 5 is optional.

The first node U1 receives first information in S10, monitors a first signaling and a second signaling in a first time-frequency resource set in S11, and, in S12, judges whether to transmit a first radio signal according to a monitoring result of the first signaling, and transmits the first radio signal in a second time-frequency resource set when judging to transmit the first radio signal.

The second node U2 transmits first information in S20, transmits at least a first signaling of the first signaling and a second signaling in a first time-frequency resource set in S21, and receives a first radio signal in a second time-frequency resource set in S22.

In Embodiment 5, the second signaling is not detected by the first node U1 in the first time-frequency resource set, a signaling format corresponding to the second signaling is used for scheduling of a data signal; the first radio signal is used for indicating that a data signal scheduled by the second signaling is not correctly decoded; the first information is used for determining K1 first-type time-frequency resource sets, and the first time-frequency resource set is one of the K1 first-type time-frequency resource sets; and the K1 first-type time-frequency resource sets are reserved for transmission of a physical layer control signaling.

In one embodiment, the second node U2 transmits the first signaling and the second signaling in the first time-frequency resource set.

In one embodiment, the second node U2 transmits only the first signaling in the first time-frequency resource set.

In one embodiment, if the first signaling is not correctly received by the first node U1, the first node U1 judges to transmit the first radio signal; otherwise, the first node U1 judges not to transmit the first radio signal.

In one embodiment, the second node U2 transmits the first signaling and the second signaling in the first time-frequency resource set.

In one embodiment, the second node U2 transmits only the first signaling in the first time-frequency resource set.

In one embodiment, the situation does not exist that the second node U2 transmits the second signaling but does not transmit the first signaling in the first time-frequency resource set.

In one embodiment, the first signaling indicates Q1 node (s) from Q nodes, and the first node U1 is one of the Q nodes; if the first node is one of the Q1 node(s), the first node U1 judges to transmit the first radio signal; otherwise, the first node U1 judges not to transmit the first radio signal; the Q is a positive integer greater than 1; and the Q1 is a positive integer not greater than the Q.

In one subembodiment, any one of the Q nodes is one terminal, or any one of the Q nodes is one UE, or any one of the Q nodes is one vehicle.

In one subembodiment, one of the Q nodes is a Road Side Unit (RSU).

In one subembodiment, the first signaling includes Q bits, and the Q bits correspond to the Q nodes respectively;

In one affiliated embodiment of the above subembodiment, Q1 bits among the Q bits are equal to 1, and the Q1 bits are used for indicating the Q1 nodes respectively.

In one subembodiment, the Q nodes correspond to Q different identifiers respectively.

In one affiliated embodiment of the above subembodiment, the first signaling includes Q bits, and the Q bits correspond to the Q different identifiers respectively.

In one subembodiment, the Q nodes all belong to one given terminal group, the given terminal group corresponds to a given terminal group identifier, and a CRC sequence included in the first signaling is scrambled with the given terminal group identifier.

In one subembodiment, the second signaling is specific to the first node U1.

In one affiliated embodiment of the above subembodiment, a CRC sequence included in the second signaling is scrambled with an identifier specific to the first node U1.

In one embodiment, the first signaling is used for determining that the second signaling is transmitted by the second node U2 in the first time-frequency resource set.

In one subembodiment, the first time-frequency resource set includes a first time-frequency resource subset and a second time-frequency resource subset, the first signaling is transmitted in the first time-frequency resource subset, and the second signaling is transmitted in the second time-frequency resource subset.

In one affiliated embodiment of the above subembodiment, time domain resources occupied by the first time-frequency resource subset and time domain resources occupied by the second time-frequency resource subset are Time Division Multiplexing (TDM).

In one embodiment, a first time window includes M1 multicarrier symbols, and the first time window is located behind time domain resources occupied by the first time-frequency resource set; the first signaling is used for determining a type of any one multicarrier symbol among the M1 multicarrier symbols; and the M1 is a positive integer greater than 1.

In one subembodiment, the type of the multicarrier symbol is a first type, or the type of the multicarrier symbol is a second type, or the type of the multicarrier symbol is a third type.

In one affiliated embodiment of the above subembodiment, the first type represents that one or multiple corresponding multicarrier symbols are used for the receiving of the first node U1.

In one affiliated embodiment of the above subembodiment, the second type represents that one or multiple corresponding multicarrier symbols are used for the transmitting of the first node U1.

In one affiliated embodiment of the above subembodiment, the third type represents that one or multiple corresponding multicarrier symbols can be used for both the receiving and the transmitting of the first node U1.

In one embodiment, the multicarrier symbol in the disclosure is an Orthogonal Frequency Division Multiplexing (OFDM) symbol.

In one embodiment, the multicarrier symbol in the disclosure is a Single-Carrier Frequency Division Multiple Access (SC-FDMA) symbol.

In one embodiment, the multicarrier symbol in the disclosure is a Filter Bank Multi Carrier (FBMC) symbol.

In one embodiment, the multicarrier symbol in the disclosure is an OFDM symbol including a Cyclic Prefix (CP).

In one embodiment, the multicarrier symbol in the disclosure is one of Discrete Fourier Transform Spreading Orthogonal Frequency Division Multiplexing (DFT-s-OFDM) symbols including a CP.

In one embodiment, a second time window is located behind time domain resources occupied by the first time-frequency resource set; and the first signaling is used for determining whether the first node U1 needs to perform a blind detection of a physical layer control signaling in the second time window.

In one subembodiment, the first signaling is correctly decoded by the first node, the first signaling is used for determining that the first node U1 needs to perform a blind detection of a physical layer control signaling in the second time window, but the second signaling is not detected by the first node U1 in the first time-frequency resource set, then the first node U1 transmits the first radio signal in the second time-frequency resource set.

In one subembodiment, a duration of the second time window in time domain is equal to a positive integer number of slots.

In one subembodiment, time domain resources included in the second time window are consecutive.

In one subembodiment, time domain resources included in the second time window include partial time domain resources occupied by the first time-frequency resource set.

In one embodiment, the first information is transmitted through an RRC signaling.

In one embodiment, the first information is information specific to a PC-5 interface.

In one embodiment, the second node U2 transmits at least one physical layer control signaling in any one of the K1 first-type time-frequency resource sets.

In one embodiment, a signaling format corresponding to the physical layer control signaling is the same as a signaling format corresponding to the first signaling.

In one embodiment, a signaling format corresponding to the physical layer control signaling is the same as a signaling format corresponding to the second signaling.

In one embodiment, a signaling format corresponding to the physical layer control signaling includes an SCI format.

In one embodiment, the first node U1 is one terminal.
In one embodiment, the first node U1 is one UE.
In one embodiment, the first node U1 is one vehicle.
In one embodiment, the first node U1 is one RSU.
In one embodiment, the second node U2 is one terminal.
In one embodiment, the second node U2 is one UE.
In one embodiment, the second node U2 is one vehicle.
In one embodiment, the second node U2 is one RSU.

Embodiment 6

Figure 6:
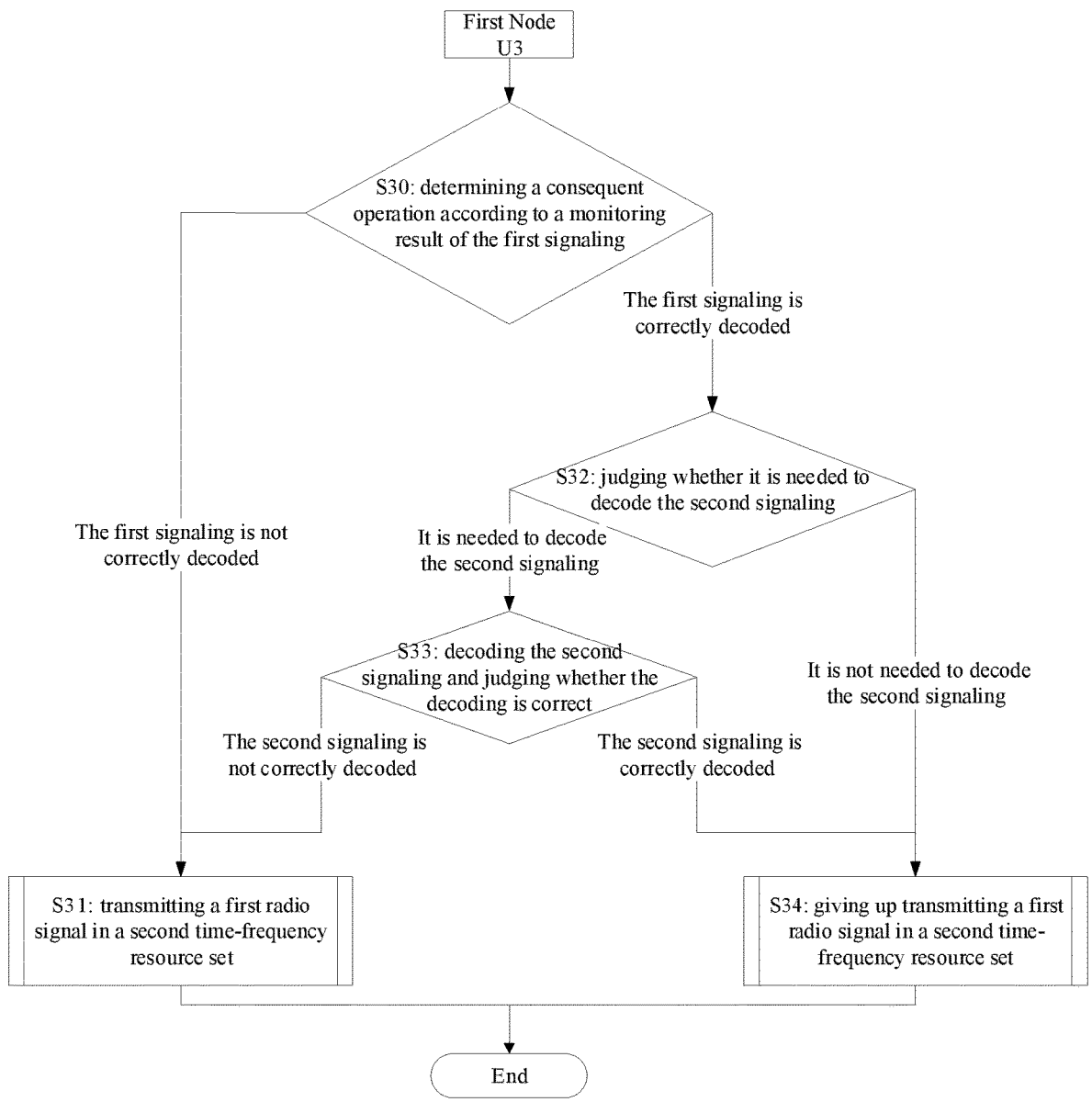
FIG. 6 is a flowchart of judging whether to transmit a first radio signal according to one embodiment of the disclosure.

Embodiment 6 illustrates a flowchart of judging whether to transmit a first radio signal, as shown in FIG. 6. A first node U3 performs the following steps:

determining a consequent operation according to a monitoring result of the first signaling in S30;
if the first signaling is not correctly decoded, the first node U3 transmits a first radio signal in a second time-frequency resource set in S31;
if the first signaling is correctly decoded, the first node U3 judges whether it is needed to decode the second signaling in S32;
if the first node U3 judges that it is needed to decode the second signaling in S32, the first node U3 decodes the second signaling and judges whether the decoding is correct in S33, if the first node U3 does not correctly decode the second signaling in S33, the first node U3 transmits a first radio signal in a second time-frequency resource set in S31; if the first node U3 correctly decodes the second signaling in S33, the first node U3 gives up transmitting a first radio signal in a second time-frequency resource set in S34;
if the first node U3 judges that it is not needed to decode the second signaling in S32, the first node U3 gives up transmitting a first radio signal in a second time-frequency resource set in S34.

In one embodiment, the decoding of the first signaling includes a blind detection.

In one embodiment, the decoding of the second signaling includes a blind detection.

In one embodiment, S11 in Embodiment 5 includes partial or all steps in Embodiment 6.

In one embodiment, S12 in Embodiment 5 includes partial or all steps in Embodiment 6.

Embodiment 7

Figure 7:
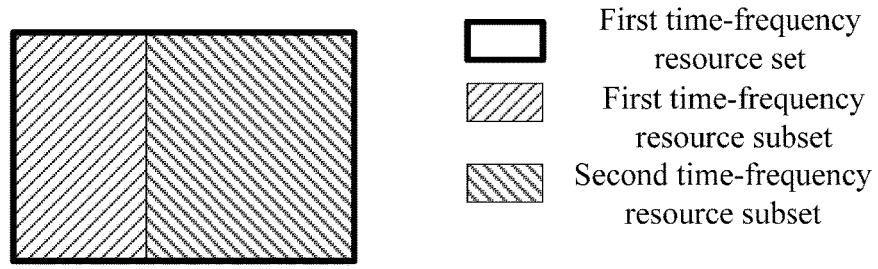
FIG. 7 is a diagram of a first time-frequency resource set according to one embodiment of the disclosure.

Embodiment 7 illustrates a diagram of a first time-frequency resource set, as shown in FIG. 7. In FIG. 7, the first time-frequency resource set includes a first time-frequency resource subset and a second time-frequency resource subset.

In one embodiment, the first time-frequency resource subset includes a positive integer number of REs.

In one embodiment, the second time-frequency resource subset includes a positive integer number of REs.

In one embodiment, time domain resources occupied by the first time-frequency resource subset and time domain resources occupied by the second time-frequency resource subset are orthogonal.

In one embodiment, time domain resources occupied by the first time-frequency resource subset are located before time domain resources occupied by the second time-frequency resource subset.

In one embodiment, the first time-frequency resource subset is one CORESET.

In one embodiment, the first time-frequency resource subset is one search space.

In one embodiment, the second time-frequency resource subset is one CORESET.

In one embodiment, the second time-frequency resource subset is one search space.

Embodiment 8

Figure 8:
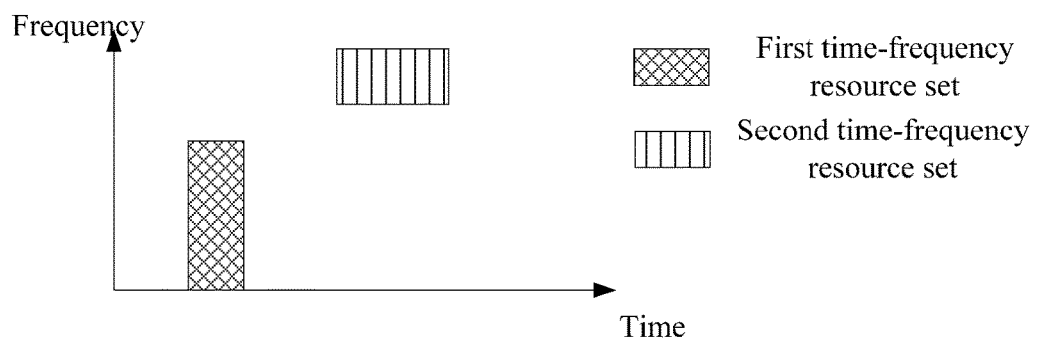
FIG. 8 is a diagram of a first time-frequency resource set and a second time-frequency resource set according to one embodiment of the disclosure.

Embodiment 8 illustrates a diagram of a first time-frequency resource set and a second time-frequency resource set, as shown in FIG. 8. In FIG. 8, the first time-frequency resource set and the second time-frequency resource set are in association.

In one embodiment, the second time-frequency resource set includes a positive integer number of REs.

In one embodiment, the above phrase that the first time-frequency resource set and the second time-frequency resource set are in association refers that: a position of time domain resources occupied by the first time-frequency resource set is used for determining a position of time domain resources occupied by the second time-frequency resource set.

In one embodiment, the above phrase that the first time-frequency resource set and the second time-frequency resource set are in association refers that: the first time-frequency resource set uniquely corresponds to the second time-frequency resource set, time-frequency resources occupied by the first time-frequency resource set are configured through a higher layer signaling, and time-frequency resources occupied by the second time-frequency resource set are configured through a higher layer signaling.

In one embodiment, the above phrase that the first time-frequency resource set and the second time-frequency resource set are in association refers that: the first node in the disclosure decodes the first signaling in the first time-frequency resource set, and the first signaling is used for indicating the second time-frequency resource set.

In one embodiment, the above phrase that the first time-frequency resource set and the second time-frequency resource set are in association refers that: the second node in the disclosure transmits at least one of the first signaling and the second signaling in the first time-frequency resource set; the second node receives the first radio signal in the second time-frequency resource set to determine whether the first signaling is correctly received by the first node, or the second node receives the first radio signal in the second time-frequency resource set to determine whether the second signaling is correctly received by the first node.

In one embodiment, the above phrase that the first time-frequency resource set and the second time-frequency resource set are in association refers that: the second node in the disclosure transmits at least one of the first signaling and the second signaling in the first time-frequency resource set; the second node receives the first radio signal in the second time-frequency resource set to determine whether a data signal scheduled by the second signaling is correctly received by the first node.

Embodiment 9

Figure 9:
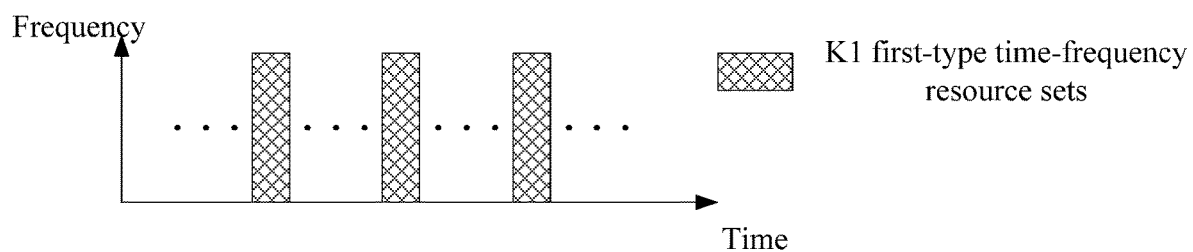
FIG. 9 is a diagram of K1 first-type time-frequency resource sets according to one embodiment of the disclosure.

Embodiment 9 illustrates a diagram of K1 first-type time-frequency resource sets, as shown in FIG. 9. In FIG. 9, the first time-frequency resource set in the disclosure is one of the K1 first-type time-frequency resource sets.

In one embodiment, a given first-type time-frequency resource set is any one of the K1 first-type time-frequency resource sets, and the given first-type time-frequency resource set includes a positive integer number of REs.

In one embodiment, any one of the K1 first-type time-frequency resource sets is configured through a higher layer signaling.

In one embodiment, any one of the K1 first-type time-frequency resource sets is predefined.

In one embodiment, any one of the K1 first-type time-frequency resource sets is configured by a base station.

In one embodiment, any one of the K1 first-type time-frequency resource sets is autonomously determined by the second node.

In one embodiment, the K1 first-type time-frequency resource sets occupy K1 first-type time units respectively, and the K1 first-type time units are periodically distributed in time domain.

In one embodiment, the K1 first-type time-frequency resource sets occupy K1 first-type time units respectively, and the K1 first-type time units are distributed in time domain at an equal interval.

In one embodiment, the K1 first-type time-frequency resource sets occupy K1 first-type time units respectively, and the K1 first-type time units are K1 slots respectively.

In one subembodiment, the K1 slots are consecutive in time domain.

In one subembodiment, the K1 slots are discrete in time domain.

In one embodiment, any one of the K1 first-type time-frequency resource sets is a CORESET.

In one embodiment, any one of the K1 first-type time-frequency resource sets is a search space.

In one embodiment, any one of the K1 first-type time units in the disclosure is one slot, or any one of the K1 first-type time units in the disclosure is one subframe.

In one embodiment, any one of the K1 first-type time units in the disclosure occupies a positive integer number of consecutive multicarrier symbols in time domain.

Embodiment 10

Figure 10:
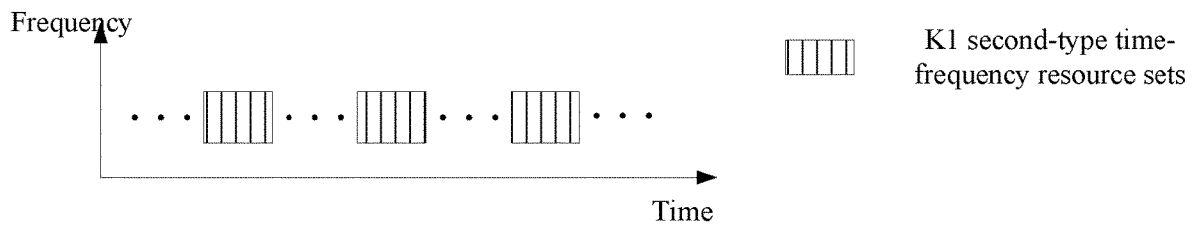
FIG. 10 is a diagram of K1 second-type time-frequency resource sets according to one embodiment of the disclosure.

Embodiment 10 illustrates a diagram of K1 second-type time-frequency resource sets, as shown in FIG. 10. In FIG. 10, the second time-frequency resource set in the disclosure is one of the K1 second-type time-frequency resource sets.

In one embodiment, a given second-type time-frequency resource set is any one of the K1 second-type time-frequency resource sets, and the given second-type time-frequency resource set includes a positive integer number of REs.

In one embodiment, any one of the K1 second-type time-frequency resource sets is configured through a higher layer signaling.

In one embodiment, any one of the K1 second-type time-frequency resource sets is predefined.

In one embodiment, any one of the K1 second-type time-frequency resource sets is configured by a base station.

In one embodiment, any one of the K1 second-type time-frequency resource sets is autonomously determined by the second node.

In one embodiment, the K1 second-type time-frequency resource sets occupy K1 second-type time units respectively, and the K1 second-type time units are periodically distributed in time domain.

In one embodiment, the K1 second-type time-frequency resource sets occupy K1 second-type time units respectively, and the K1 second-type time units are distributed in time domain at an equal interval.

In one embodiment, the K1 second-type time-frequency resource sets occupy K1 second-type time units respectively, and the K1 second-type time units are K1 slots respectively.

In one subembodiment, the K1 slots are consecutive in time domain.

In one subembodiment, the K1 slots are discrete in time domain.

In one embodiment, any one of the K1 second-type time-frequency resource sets is a PSFCH resource.

In one embodiment, the K1 first-type time-frequency resource sets correspond to the K1 second-type time-frequency resource sets respectively.

In one subembodiment, the first node determines the second time-frequency resource set from the K1 second-type time-frequency resources through a position of the first time-frequency resource set in the K1 first-type time-frequency resource sets.

In one affiliated embodiment of the above subembodiment, the position of the first time-frequency resource set in the K1 first-type time-frequency resource sets includes a time domain position of the first time-frequency resource set in the K1 first-type time-frequency resource sets.

In one affiliated embodiment of the above subembodiment, the position of the first time-frequency resource set in the K1 first-type time-frequency resource sets includes a frequency domain position of the first time-frequency resource set in the K1 first-type time-frequency resource sets.

In one affiliated embodiment of the above subembodiment, the position of the first time-frequency resource set in the K1 first-type time-frequency resource sets includes a time-frequency position of the first time-frequency resource set in the K1 first-type time-frequency resource sets.

In one embodiment, any one of the K1 second-type time units in the disclosure is one slot, or any one of the K1 second-type time units in the disclosure is one subframe.

In one embodiment, any one of the K1 second-type time units in the disclosure occupies a positive integer number of consecutive multicarrier symbols in time domain.

Embodiment 11

Figure 11:
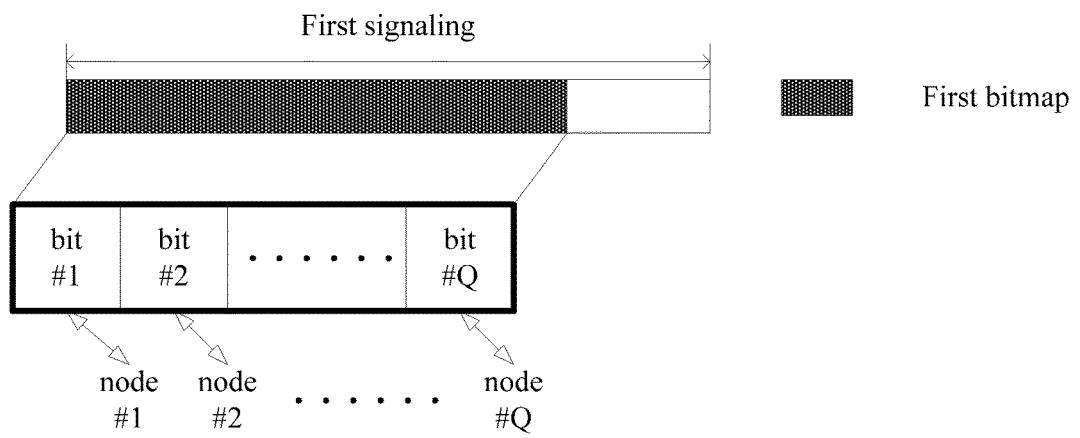
FIG. 11 is a diagram of a first signaling according to one embodiment of the disclosure.

Embodiment 11 illustrates a diagram of a first signaling, as shown in FIG. 11. In FIG. 11, the first signaling indicates Q1 node(s) from Q nodes, and the first node in the disclosure is one of the Q nodes. The first signaling includes a bitmap, the first bitmap includes Q bits, the Q bits are a bit #1 to a bit #Q respectively, and the bit #1 to the bit #Q correspond to a node #1 to a node #Q in the Q nodes respectively.

In one embodiment, the Q nodes correspond to Q identifiers respectively, and the Q identifiers correspond to the Q bits included in the first bitmap respectively.

In one subembodiment, the Q identifiers are related to Cell Radio Network Temporary Identifiers (C-RNTIs) of the Q nodes respectively.

In one subembodiment, any two of the Q identifiers are different.

In one subembodiment, the Q identifiers are related to International Mobile Subscriber Identification Numbers (IMSIs) of the Q nodes respectively.

In one subembodiment, the Q identifiers are related to SAE Temporary Mobile Subscriber Identities (S-TMSIs) of the Q nodes respectively, wherein SAE represents System Architecture Evolution.

In one subembodiment, a given identifier is any one of the Q identifiers, and the given identifier is used for uniquely determining one node from the Q nodes.

In one subembodiment, the second node configures the Q identifiers for the Q nodes.

In one embodiment, the Q nodes and the second node in the disclosure all belong to a given terminal group.

In one subembodiment, the second node is a group head of the given terminal group, or the second node is a group manager of the given terminal group.

In one embodiment, for the Q1 node(s) indicated from the Q nodes by the first signaling, any one of the Q1 nodes needs to perform a blind detection of the second signaling in the first time-frequency resource set.

Embodiment 12

Figure 12:
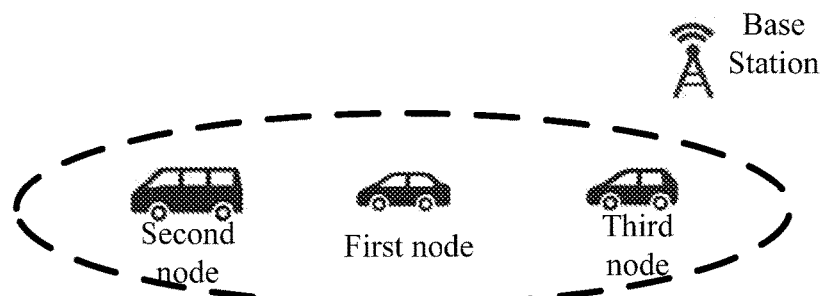
FIG. 12 is a diagram of a first node and a second node according to one embodiment of the disclosure.

Embodiment 12 illustrates a diagram of a first node and a second node, as shown in FIG. 12. In FIG. 12, the first node and the second node both belong to a given terminal group; the given terminal group includes a positive integer number of terminals, and the second node is a group manager of the given terminal group; the dash line part in FIG. 12 represents a scope of the given terminal group; a third node shown in FIG. 12 is a node within the given terminal group rather than the first node and the second node.

In one embodiment, the first node and the second node perform V2X communication.

In one embodiment, a base station configures the K1 first-type time-frequency resource sets, and transmits the configuration information to the second node.

In one embodiment, a base station configures the K1 second-type time-frequency resource sets, and transmits the configuration information to the second node.

In one embodiment, the third node is one of the Q nodes in the disclosure rather than the first node and the second node.

Embodiment 13

Figure 13:
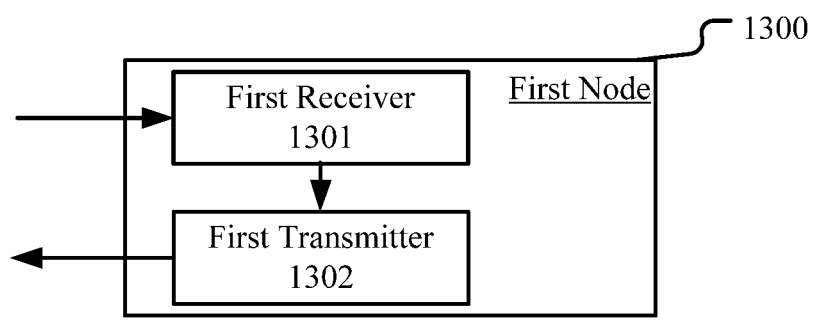
FIG. 13 is a structure block diagram illustrating a processing device in a first node according to one embodiment of the disclosure.

Embodiment 13 illustrates a structure block diagram of a processing device in a first node, a shown in FIG. 13. In FIG. 13, the processing device in the first node 1300 includes a first receiver 1301 and a first transmitter 1302.

The first receiver 1301 monitors a first signaling and a second signaling in a first time-frequency resource set.

The first transmitter 1302 judges whether to transmit a first radio signal according to a monitoring result of the first signaling; and transmits the first radio signal in a second time-frequency resource set, when judging to transmit the first radio signal.

In Embodiment 13, the second signaling is not detected in the first time-frequency resource set, a signaling format corresponding to the second signaling is used for scheduling of a data signal; and the first radio signal is used for indicating that a data signal scheduled by the second signaling is not correctly decoded.

In one embodiment, if the first signaling is not correctly received, the first node 1300 judges to transmit the first radio signal; otherwise, the first node 1300 judges not to transmit the first radio signal.

In one embodiment, the first signaling indicates Q1 node(s) from Q nodes, and the first node 1300 is one of the Q nodes; if the first node 1300 is one of the Q1 node(s), the first node 1300 judges to transmit the first radio signal; otherwise, the first node 1300 judges not to transmit the first radio signal; the Q is a positive integer greater than 1; and the Q1 is a positive integer not greater than the Q.

In one embodiment, the first signaling is used for determining that the second signaling is transmitted by a transmitter of the first signaling in the first time-frequency resource set.

In one embodiment, a first time window includes M1 multicarrier symbols, and the first time window is located behind time domain resources occupied by the first time-frequency resource set; the first signaling is used for determining a type of any one multicarrier symbol among the M1 multicarrier symbols; and the M1 is a positive integer greater than 1.

In one embodiment, a second time window is located behind time domain resources occupied by the first time-frequency resource set; and the first signaling is used for determining whether the first node 1300 needs to perform a blind detection of a physical layer control signaling in the second time window.

In one embodiment, the first receiver 1301 further receives first information; the first information is used for determining K1 first-type time-frequency resource sets, and the first time-frequency resource set is one of the K1 first-type time-frequency resource sets; and the K1 first-type time-frequency resource sets are reserved for transmission of a physical layer control signaling.

In one embodiment, the first receiver 1301 includes at least the former four of the antenna 452, the receiver 454, the multiantenna receiving processor 458, the receiving processor 456, or the controller/processor 459 illustrated in Embodiment 4.

In one embodiment, the first transmitter 1302 includes at least the former four of the antenna 452, the transmitter 454, the multiantenna transmitting processor 457, the transmitting processor 468 or the controller/processor 459 illustrated in Embodiment 4.

Embodiment 14

Figure 14:
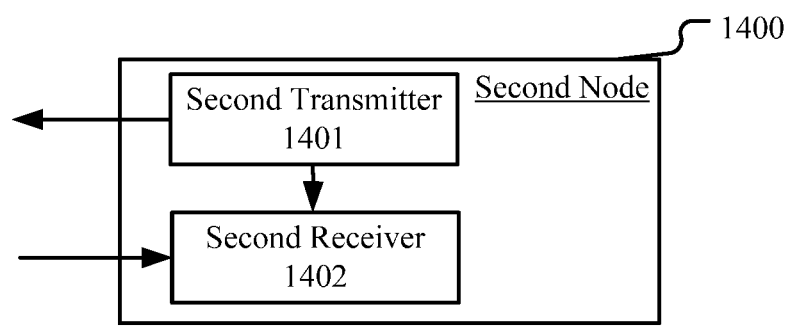
FIG. 14 is a structure block diagram illustrating a processing device in a second node according to one embodiment of the disclosure.

Embodiment 14 illustrates a structure block diagram of a processing device in a second node, a shown in FIG. 14. In FIG. 14, the processing device in the second node 1400 includes a second transmitter 1401 and a second receiver 1402.

The second transmitter 1401 transmits at least a first signaling of the first signaling and a second signaling in a first time-frequency resource set.

The second receiver 1402 receives a first radio signal in a second time-frequency resource set.

In Embodiment 14, the second signaling is not detected in the first time-frequency resource set, a signaling format corresponding to the second signaling is used for scheduling of a data signal; and the first radio signal is used for indicating that a data signal scheduled by the second signaling is not correctly decoded by a transmitter of the first radio signal.

In one embodiment, if the first signaling is not correctly received by the transmitter of the first radio signal, the transmitter of the first radio signal judges to transmit the first radio signal; otherwise, the transmitter of the first radio signal judges not to transmit the first radio signal.

In one embodiment, the first signaling indicates Q1 node(s) from Q nodes, and the transmitter of the first radio signal is one of the Q nodes; if the Q1 is not less than 1, the second node 1400 receives the first radio signal in the second time-frequency resource set; the Q is a positive integer greater than 1; and the Q1 is a positive integer not greater than the Q.

In one embodiment, the first signaling is used for determining that the second signaling is transmitted by the second node 1400 in the first time-frequency resource set.

In one embodiment, a first time window includes M1 multicarrier symbols, and the first time window is located behind time domain resources occupied by the first time-frequency resource set; the first signaling is used for determining a type of any one multicarrier symbol among the M1 multicarrier symbols; and the M1 is a positive integer greater than 1.

In one embodiment, a second time window is located behind time domain resources occupied by the first time-frequency resource set; and the first signaling is used for determining whether the transmitter of the first radio signal needs to perform a blind detection of a physical layer control signaling in the second time window.

In one embodiment, the second transmitter 1401 further transmits first information; the first information is used for determining K1 first-type time-frequency resource sets, and the first time-frequency resource set is one of the K1 first-type time-frequency resource sets; and the K1 first-type time-frequency resource sets are reserved for transmission of a physical layer control signaling.

In one embodiment, the second transmitter 1401 includes at least the former four of the antenna 420, the transmitter 418, the multiantenna transmitting processor 471, the transmitting processor 416, or the controller/processor 475 illustrated in Embodiment 4.

In one embodiment, the second receiver 1402 includes at least the former four of the antenna 420, the receiver 418, the multiantenna receiving processor 472, the receiving processor 470, or the controller/processor 475 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first node and the second node in the disclosure include but not limited to mobile phones, tablet computers, laptops, network cards, low-power equipment, eMTC terminals, NB-IOT terminals, vehicle-mounted communication equipment, transport tools, vehicles, RSUs, aircrafts, airplanes, unmanned aerial vehicles, telecontrolled aircrafts, and other radio communication equipment. The base station in the disclosure includes but not limited to macro-cellular base stations, micro-cellular base stations, home base stations, relay base stations, eNBs, gNBs, TRPs, GNSSs, relay satellites, satellite base stations, air base stations, RSUs and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first node for wireless communication, comprising:
   monitoring a first signaling and a second signaling in a first time-frequency resource set; and
   judging whether to transmit a first radio signal according to a monitoring result of the first signaling; and transmitting the first radio signal in a second time-frequency resource set, when judging to transmit the first radio signal;
   wherein the second signaling is not correctly decoded in the first time-frequency resource set, a signaling format corresponding to the second signaling is used for scheduling of a data signal; and the first radio signal is used for indicating that a data signal scheduled by the second signaling is not correctly decoded; the first signaling includes a first Physical Sidelink Control Channel (PSCCH); the second signaling includes a second PSCCH; a physical layer channel occupied by the first radio signal includes a Physical Sidelink Feedback Channel (PSFCH); the first signaling is correctly decoded; the first signaling indicates Q1 node(s) from Q nodes, and the first node is one of the Q nodes; if the first node is one of the Q1 node(s), it is judged to transmit the first radio signal; otherwise, it is judged not to transmit the first radio signal; the Q is a positive integer greater than 1; and the Q1 is a positive integer not greater than the Q; any one of the Q nodes is one terminal, or any one of the Q nodes is one UE, or any one of the Q nodes is one vehicle; the Q nodes correspond to Q different identifiers respectively; the first signaling comprises Q bits, and the Q bits correspond to the Q different identifiers respectively; the Q nodes all belong to one given terminal group, the given terminal group corresponds to a given terminal group identifier, and a CRC sequence comprised in the first signaling is scrambled with the given terminal group identifier; Q is a positive integer greater than 1.

2. A first node for wireless communication, comprising:
a first receiver, to monitor a first signaling and a second signaling in a first time-frequency resource set; and
a first transmitter, to judge whether to transmit a first radio signal according to a monitoring result of the first signaling; and to transmit the first radio signal in a second time-frequency resource set, when judging to transmit the first radio signal;
wherein the second signaling is not correctly decoded in the first time-frequency resource set, a signaling format corresponding to the second signaling is used for scheduling of a data signal; and the first radio signal is used for indicating that a data signal scheduled by the second signaling is not correctly decoded; the first signaling includes a first Physical Sidelink Control Channel (PSCCH); the second signaling includes a second PSCCH; a physical layer channel occupied by the first radio signal includes a Physical Sidelink Feedback Channel (PSFCH); the first signaling is correctly decoded; the first signaling indicates Q1 node(s) from Q nodes, and the first node is one of the Q nodes; if the first node is one of the Q1 node(s), it is judged to transmit the first radio signal; otherwise, it is judged not to transmit the first radio signal; the Q is a positive integer greater than 1; and the Q1 is a positive integer not greater than the Q; any one of the Q nodes is one terminal, or any one of the Q nodes is one UE, or any one of the Q nodes is one vehicle; the Q nodes correspond to Q different identifiers respectively; the first signaling comprises Q bits, and the Q bits correspond to the Q different identifiers respectively; the Q nodes all belong to one given terminal group, the given terminal group corresponds to a given terminal group identifier, and a CRC sequence comprised in the first signaling is scrambled with the given terminal group identifier.

3. The first node according to claim 2, wherein if the first signaling is not correctly received, it is judged to transmit the first radio signal; otherwise, it is judged not to transmit the first radio signal.

4. The first node according to claim 2, wherein the first signaling is used for determining that the second signaling is transmitted by a transmitter of the first signaling in the first time-frequency resource set.

5. The first node according to claim 2, wherein a first time window comprises M1 multicarrier symbols, and the first time window is located behind time domain resources occupied by the first time-frequency resource set; the first signaling is used for determining a type of any one multicarrier symbol among the M1 multicarrier symbols; and the M1 is a positive integer greater than 1.

6. The first node according to claim 2, wherein a second time window is located behind time domain resources occupied by the first time-frequency resource set; and the first signaling is used for determining whether the first node needs to perform a blind detection of a physical layer control signaling in the second time window.

7. The first node according to claim 2, wherein the first receiver further receives first information; the first information is used for determining K1 first-type time-frequency resource sets, and the first time-frequency resource set is one of the K1 first-type time-frequency resource sets; and the K1 first-type time-frequency resource sets are reserved for transmission of a physical layer control signaling; K1 is an integer greater than 1.

8. The first node according to claim 2, wherein the first time-frequency resource set comprises a first time-frequency resource subset and a second time-frequency resource subset, the first signaling is transmitted in the first time-frequency resource subset, and the second signaling is transmitted in the second time-frequency resource subset; and time domain resources occupied by the first time-frequency resource subset are located before time domain resources occupied by the second time-frequency resource subset.

9. The first node according to claim 2, wherein the second time-frequency resource set is associated to the first signaling, or the first signaling is used for determining the second time-frequency resource set.

10. A second node for wireless communication, comprising:
a second transmitter, to transmit at least a first signaling of the first signaling and a second signaling in a first time-frequency resource set; and
a second receiver, to receive a first radio signal in a second time-frequency resource set;
wherein the second signaling is not correctly decoded in the first time-frequency resource set, a signaling format corresponding to the second signaling is used for scheduling of a data signal; and the first radio signal is used for indicating that a data signal scheduled by the second signaling is not correctly decoded by a transmitter of the first radio signal; the first signaling includes a first Physical Sidelink Control Channel (PSCCH); the second signaling includes a second PSCCH; a physical layer channel occupied by the first radio signal includes a Physical Sidelink Feedback Channel (PSFCH); the first signaling is correctly decoded; the first signaling indicates Q1 node(s) from Q nodes, and the first node is one of the Q nodes; if the first node is one of the Q1 node(s), it is judged to transmit the first radio signal; otherwise, it is judged not to transmit the first radio signal; the Q is a positive integer greater than 1; and the Q1 is a positive integer not greater than the Q; any one of the Q nodes is one terminal, or any one of the Q nodes is one UE, or any one of the Q nodes is one vehicle; the Q nodes correspond to Q different identifiers respectively; the first signaling comprises Q bits, and the Q bits correspond to the Q different identifiers respectively; the Q nodes all belong to one given terminal group, the given terminal group corresponds to a given terminal group identifier, and a CRC sequence comprised in the first signaling is scrambled with the given terminal group identifier.

11. The second node according to claim 10, wherein the first signaling is used for determining that the second signaling is transmitted by the second node in the first time-frequency resource set.

12. The second node according to claim 10, wherein a first time window comprises M1 multicarrier symbols, and the first time window is located behind time domain resources occupied by the first time-frequency resource set; the first signaling is used for determining a type of any one multicarrier symbol among the M1 multicarrier symbols; and the M1 is a positive integer greater than 1.

13. The second node according to claim 10, wherein a second time window is located behind time domain resources occupied by the first time-frequency resource set;

and the first signaling is used for determining whether the first node needs to perform a blind detection of a physical layer control signaling in the second time window.

14. The second node according to claim 10, wherein the first receiver further receives first information; the first information is used for determining K1 first-type time-frequency resource sets, and the first time-frequency resource set is one of the K1 first-type time-frequency resource sets; and the K1 first-type time-frequency resource sets are reserved for transmission of a physical layer control signaling; K1 is an integer greater than 1.

15. The second node according to claim 10, wherein the first time-frequency resource set comprises a first time-frequency resource subset and a second time-frequency resource subset, the first signaling is transmitted in the first time-frequency resource subset, and the second signaling is transmitted in the second time-frequency resource subset; and time domain resources occupied by the first time-frequency resource subset are located before time domain resources occupied by the second time-frequency resource subset.

16. The second node according to claim 10, wherein the monitoring result of the first signaling comprises whether the transmitter of the first radio signal correctly decodes the first signaling, or the monitoring result of the first signaling comprises an indication content in the first signaling.

* * * * *